United States Patent Office 3,020,798
Patented Feb. 13, 1962

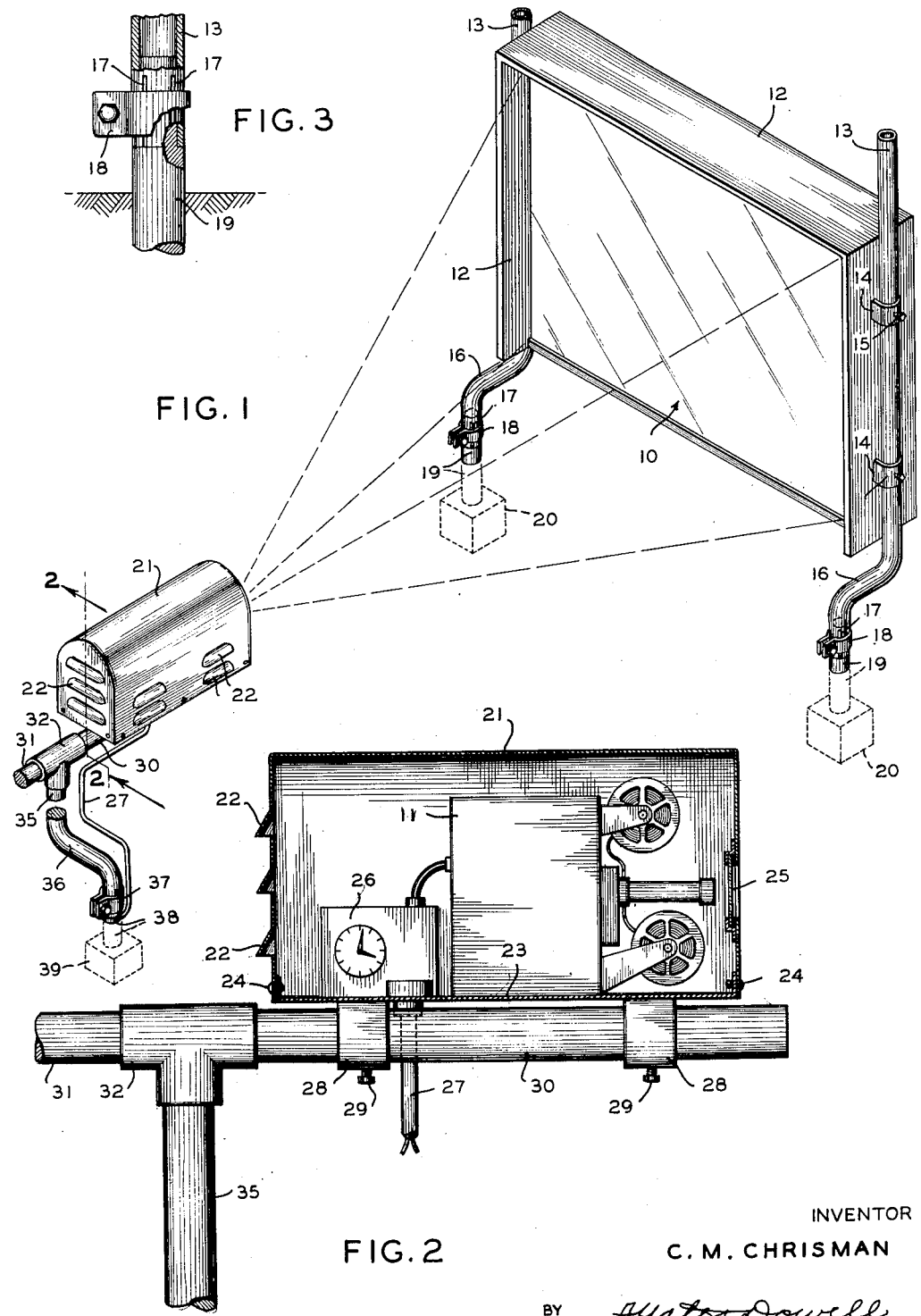

3,020,798
PROJECTION ADVERTISING
Charles M. Chrisman, 20 Tracy Drive, Columbia, Mo.
Filed Sept. 17, 1957, Ser. No. 684,522
4 Claims. (Cl. 88—24)

This invention relates to the promotion and sale of merchandise including methods of advertising and promoting sales by billboards and other signs erected in advantageous locations, and papered, painted, or finished in any other desired manner and using neon or other lights of any desired character.

The invention relates to the type of signs which are periodically changed as to substance, color, and the like, in order to advertise different products, to vary the type of illustration, color and other characteristics, and to give consideration to current events, the seasons, and the like.

Outdoor advertising signs as well as indoor have been expensive to install and maintain requiring a crew of men to spend several hours in changing dependent upon the nature and size of the same, and consequently such signs have become outmoded, unsatisfactory, and of little value.

It is an object of the invention to provide a new type of more colorful, life-like, effective and eye-catching outdoor advertising, which is simple and easy to install, which can be prefabricated, installed, adjusted, and maintained at small cost, and in which the advertisement can be easily changed with minimum effort and expense.

Another object of the invention is to provide advertising by means of a projector and a screen for both day and night outdoor use, and in which moving or still pictures in colors or in black and white may be shown.

A further object of the invention is to provide projection advertising apparatus which is simple, inexpensive, and relatively foolproof, in which both the screen and the projector are sheltered or protected, and with or without automatic control means for setting the unit in operation, as well as apparatus having flexibility contributing to maximum utilization and satisfaction.

Other objects and advantages of the invention will be apparent from the following description taken in conjunction with the accompanying drawing wherein:

FIG. 1 is a perspective of the apparatus in accordance with the present invention set up and ready for use;

FIG. 2, a section on the line 2—2 of FIG. 1; and

FIG. 3, an enlarged detail of one of the couplings.

Briefly stated the invention comprises a screen and a projector with mounting and protective means therefor, such screen and projector being intended primarily for outdoor use although suitable for arcades and other uses. The mounting of the screen and projector is by means of hollow columns set on concrete, such hollow columns being removably telescoped over rods which scarcely project above the surface of the earth but receive thereon such hollow columns fastened in place in any desired manner as for example by clamps disposed thereabout.

The screen preferably is of such reflective material that a picture may be shown thereon which will be visible from either side both day and night and to facilitate the projection the screen is provided with a relatively wide frame which protects the screen from the elements and especially from the sun. The screen is mounted on a pair of upright columns by means of brackets. The support for the projector likewise is mounted on a column removably attached to the concrete base supporting a projector housing having louvers or vents, which housing protects the interior equipment against the weather and unauthorized interference and removal. The housing, besides enclosing the projector, may also house other appropriate equipment such as a time clock, photoelectric cell or similar mechanism for starting, stopping or modifying the operation of the unit. The hollow support for the projector includes an upright post provided with an offset and a horizontal portion to which the housing is adjustably attached by means of a clamp.

Referring to the drawing in greater detail, the device of the present invention comprises a screen 10 and a projector 11 by means of which illustrations and representations of various kinds in black and white or in color may be projected onto the screen 10.

The device is intended primarily for outdoor use along a street or highway, although it may be used in arcades and other locations. For maximum benefit it is clear that the device should be used where traffic is greatest so that the invention will be seen by the most people in order that the benefit may be proportionate.

The screen 10 is of the outdoor type unaffected by weather, preferably is of reflective material of a character that a picture may be shown thereon which will be visible from either side, both day and night. The screen includes a relatively wide frame 12 which is located around three sides, the top and ends, of the screen and protects it from the elements, especially from the direct rays of the sun.

The screen may be mounted in any desired manner as for example on a pair of uprights or columns 13 by means of brackets 14, and secured in place by set screws 15, such columns and brackets preferably being disposed at the ends of the frame to render the screen accessible from both sides and in order not to interfere with the viewing thereof.

The columns 13 may have offset portions 16 for adjustment purposes and the lower ends of the upright columns 13 are adapted to have longitudinal cuts 17 to render them compressible by clamps 18 so that they may be removably received on anchor posts 19, embedded in base members 20 of concrete or the like. This method of mounting allows adjustment, is simple, inexpensive and satisfactory.

The projector is mounted in a housing 21 having ventilating louvers or openings 22, the housing being mounted on a base or support 23 and being attached thereto by fasteners 24. The housing also is provided with a window 25 through which an image is adapted to be projected by the projector 11.

If desired, a timer 26 may be employed and electrical energy may be supplied from any suitable source by means of a conductor 27. The support 23 for the housing and the projector may be mounted in any desired manner for example by means of a pair of brackets 28 adapted by means of a set screw 29 to be secured on a pair of sleeve-forming bars 30 and 31 threaded in opposite ends of a T-coupling 32.

The T-coupling 32 is mounted on the upper end of an upright column 35 having an offset 36 adjacent to its lower end and corresponding to the offsets 16 on the posts or columns 13 which mount the screen. The lower end of the column 35 is longitudinally slitted like the lower ends of the columns 13, and provided with an external clamp 37 by means of which the column 35 may be clamped upon a post 38 carried in a base 39 or the like of concrete.

It will be obvious to those skilled in the art that various changes may be made in the invention without departing from the spirit and scope thereof and therefore the invention is not limited by that which is illustrated in the drawing and described in the specification, but only as indicated in the accompanying claims.

What is claimed is:

1. Apparatus for projection advertising comprising in combination a projector with mounting means therefor, a screen cooperating with and spaced from said projector, a mounting for the screen, the mounting comprising a pair of vertical columns, each column having a vertical upper portion attached to a side of the screen, an intermediate laterally extending portion and a lower vertical portion offset from said upper vertical portion, a pair of spaced anchor posts and means on the lower end of each of said lower offset vertical portions rotatably engaging an anchor post, whereby the screen may be adjusted in position with respect to the projector.

2. The subject matter of claim 1 wherein the projection mounting means includes a vertical column with offset therein similar to the vertical column and offset supporting the screen, and a post rotatably supporting the lower end of the column.

3. The subject matter of claim 2 wherein the vertical column at its upper end supports a horizontal bar and the projector is provided with brackets adjustably engaging the bar.

4. The subject matter of claim 1 wherein the lower end of each lower offset vertical portion is provided with slots and a clamp surrounds the slotted end to adjustably clamp the lower end of the mounting means to the anchor post.

References Cited in the file of this patent

UNITED STATES PATENTS

| | | |
|---|---|---|
| 432,614 | Hendrick | July 22, 1890 |
| 564,971 | Cline | Aug. 4, 1896 |
| 641,748 | Smith | Jan. 23, 1900 |
| 660,773 | Henry | Oct. 30, 1900 |
| 820,511 | Marten | May 15, 1906 |
| 935,715 | Watson | Oct. 5, 1909 |
| 1,279,420 | Perris | Sept. 17, 1918 |
| 1,644,580 | Gould | Oct. 4, 1927 |
| 1,679,311 | Knott | July 31, 1928 |
| 1,969,547 | Corsgren | Aug. 7, 1934 |
| 2,060,817 | Mahoney | Nov. 17, 1936 |
| 2,341,223 | Lillie | Feb. 8, 1944 |
| 2,473,301 | Ramstad | Jan. 14, 1949 |
| 2,599,269 | Markle | June 3, 1952 |
| 2,746,208 | Lewis | May 22, 1956 |
| 2,796,802 | De Felice | June 25, 1957 |